J. BALMORE.
Combined Gas Scrubber and Washer.
No. 199,492. Patented Jan. 22, 1878.
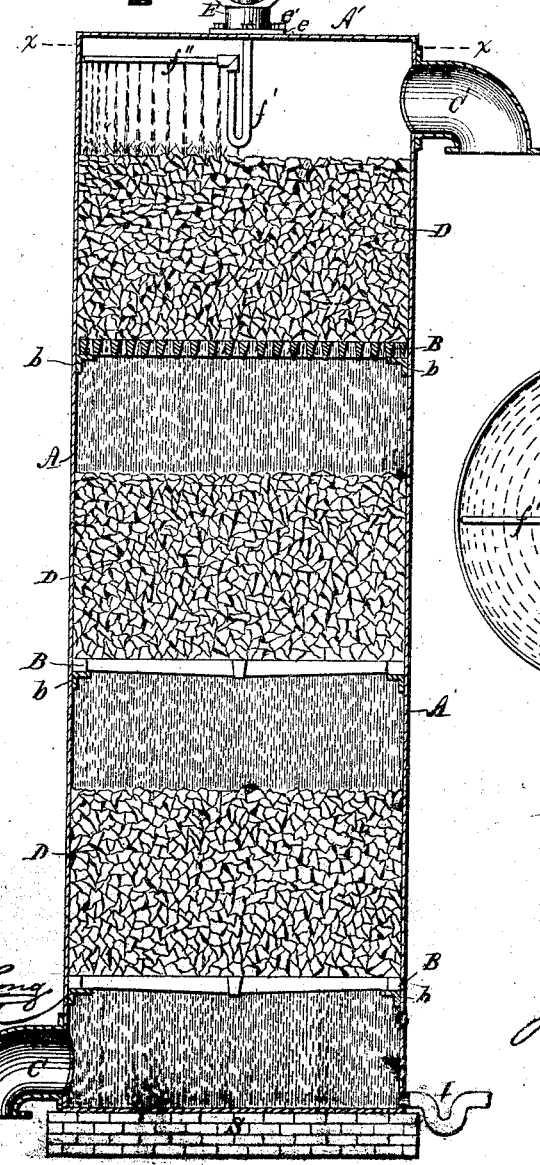
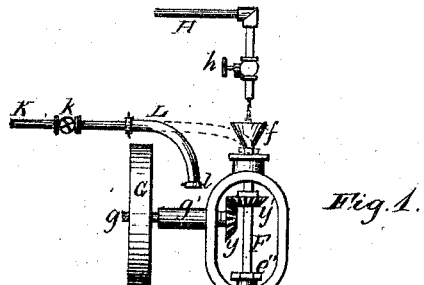
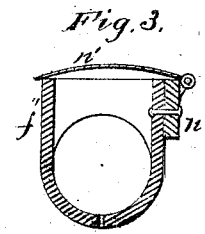

UNITED STATES PATENT OFFICE.

JOHN BALMORE, OF NEW YORK, (HARLEM,) N. Y.

IMPROVEMENT IN COMBINED GAS SCRUBBER AND WASHER.

Specification forming part of Letters Patent No. 199,492, dated January 22, 1878; application filed November 2, 1877.

*To all whom it may concern:*

Be it known that I, JOHN BALMORE, gas engineer, of One Hundred and Eleventh street and First avenue, New York city, (Harlem,) in the county of New York and State of New York, have invented certain new and useful Improvements in Combined Gas Scrubber and Washer; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention is an improvement in that class of scrubbers and washers in which the gas is washed by a shower or spray of water.

The object of the invention is to effectually and economically remove from gas its mechanical impurities and its ammoniacal products with a limited supply of water, thoroughly utilized, whereby expense for water is curtailed, the ammonia-liquor is produced in a concentrated condition, desirable for the market, and a rich gas is produced.

The invention consists, first, in a combined gas scrubber and washer having beds of porous material and intervening spaces, in combination with a horizontal, radial, revolving, perforated spray pipe or trough, having a vertical limb extending centrally through the head of the scrubber; second, in a perforated spray pipe or trough of lead, combined with a gas-washer; third, in a perforated spray pipe or trough, having a U-shaped water-seal bend or trap, combined with a gas-washer; fourth, in a central, radial, revolving, perforated spray-pipe, having a U-shaped trap, combined with operating mechanism for revolving it and the cylinder of a gas washer and scrubber; fifth, in a radial, revolving, perforated spray pipe or trough in which the perforations increase in number and size from the inner toward the outer end, whereby the water is sprinkled evenly from center to circumference, and every part of the surface is equally wetted; sixth, in a radial, revolving, perforated, lead spray pipe or trough, having a U-shaped water-seal bend, combined with a gas washer and scrubber; seventh, in a steam-jet apparatus, combined with a perforated spray pipe or trough, of a gas-washer and scrubber, for dissolving and blowing out tarry or other obstructions; also, in novelties in construction of the spray-trough.

The secret of washing and scrubbing gas is to use as little water as possible for removing those impurities that can be removed by it. By experiment I have discovered that the machine herein described will perform that duty in the most thorough manner with the least liability to become clogged or get out of order. Such a machine has long been sought by gas-manufacturers. I can use little or much water at my option, as I have perfect control of the supply at the valve in the supply-pipe, above the funnel, on top of the machine, where I can both measure and see the stream continually. The square surface of a washer and scrubber in use is fifty square feet, and I can distribute one pint of water as equally on this surface per minute as ten gallons, and also the larger quantity just as equally as the smaller.

The lead spray-pipe is an important feature of my invention.

By experiment I have found that spray-pipes of iron or other ordinary metal are soon corroded by the action of the acids, the sulphur, and ammonia compounds in the gas, the perforations becoming clogged thereby and the device rendered inoperative.

I have found also that a lead spray-pipe resists the action of the acids, the sulphur, and ammonia compounds, and that its perforations are not clogged by corrosion, thus remaining comparatively clear and open.

Should tarry matter obstruct the pipe, it is dissolved and blown out by a jet of steam.

In the accompanying drawings, Figure 1 is a vertical sectional view of the washing and scrubbing cylinder, with the spraying apparatus in elevation. Fig. 2 is a horizontal section at the line $x\,x$ of Fig. 1; and Fig. 3 is a section on a larger scale, showing the construction of the spraying-trough.

A is a cylindrical case, of plate-iron or other suitable material, resting upon a base, S, of brick or stone. The cylinder is provided with grates B B, of wood or metal, resting upon brackets or lugs $b\,b$. The grates are placed equal distances apart, and support beds of coke D or similar light, porous material, which occupies about five-eighths of the space between the grates, the space above each bed of coke being left for the spray or shower of water dripping from above.

The induction-pipe C for gas enters the lower part of the scrubber, and the eduction-pipe C' leads from the upper part. Mounted upon top of the scrubber, at its center, is a metal frame, E, having a flange, e, through which are passed rivets or screw-bolts $e'$ for securing the frame to the head A'. This frame supports the revolving water-pipe and the operating-gearing. The lead water-pipe F, having a funnel, $f$, passes through a suitable guide-opening in the top of the frame and through a stuffing-box, $e''$, below, thence down into the scrubber, where it makes a U-bend at $f'$, forming a seal-trap, the rising limb extending nearly to the head A', where it has joined to it the horizontal perforated spray pipe or trough $f''$. The perforations are made larger and placed at shorter distances apart toward the outer end of this pipe or trough. This arrangement of the perforations is essential, in order to secure an even distribution of the water, so that every part of the surface of coke will be equally wetted.

The operating-gearing consists of a belt-wheel, G, the shaft or axle $g$ of which extends through a box, $g'$, and has at its inner end a bevel cog-wheel, $y$, which meshes with the bevel cog-wheel $y'$ secured to the water-pipe F. The pipe H, leading from the main or other source, supplies water for washing the gas. It has a valve, $h$, for regulating the quantity of water supplied to the spray-pipe.

K is a steam-pipe, having a valve, $k$, to which is attached, by an iron nipple, the rubber or other flexible hose, L. When necessary to remove any obstruction that may accumulate in the spray-pipe or trough, the funnel is removed from the spray-pipe, (which has a screw-thread on its upper end,) and there is connected to it the rubber hose by a union coupling. The steam is then turned on for a moment or more, when the steam-pipe is removed, the funnel replaced, and the water turned on.

I prefer to construct the spray-trough as shown in section, Fig. 3. It is made of lead about one-eighth of an inch thick, and has a diameter of one inch. It has an iron backing, $n$, to give it strength, secured by rivets, and has a hinged cover, $n'$, to keep out dirt and dust. The cover opens like that of a tobacco-box, so that the trough may be opened and cleaned, if necessary.

I wish it understood that I do not limit myself to this particular construction of spray-trough. A simple lead pipe, properly perforated, answers the purpose very well, and is within the limits of my invention.

The U-shaped trap $f'$, being filled with water, prevents the escape of gas through the spray-pipe.

The operation of the machine is as follows: The belt-wheel being connected by a belt with some prime motor, as a steam-engine, the operating-gearing is put in motion, revolving the water-pipe F and its spraying-arm $f''$.

The water is turned on at $h$, and passed through pipe F and the perforated pipe or trough $f''$, from which it falls in a fine shower or spray upon every part of surface of the first bed of coke. From the first grating it falls in a shower to the next bed of coke, and so on to the bottom of the scrubber. The gas admitted through the induction-pipe C passes through the first shower of water, thence through the interstices of the first bed of wet and dripping coke, then through the successive showers and beds of coke, and, finally, out at the eduction-pipe C'.

With this apparatus the gas is completely broken up, and every atom brought into intimate contact with the sprays of water and the coke, so that by the time it reaches the eduction-pipe it is freed from its tarry impurities and from its ammoniacal products, which latter are absorbed by the water. The ammonia-liquor, in a concentrated form, is passed off at the bottom of the scrubber through the trap-pipe I. By this operation, according to my process, several important results are secured, viz: A limited quantity of water is used—that is, only a sufficient quantity to absorb all the ammonia, so that none of the former is wasted. The ammonia-liquor is thus produced in a concentrated form—the condition most desirable for the market. By the use of a limited definite quantity of water, also, the gas treated is of a richer, better quality than it would be if washed with a large excessive quantity of water. The use of a large excessive quantity of water is objectionable, for the reason that it removes from the gas the volatile hydrocarbons, olefiant gas, &c., thus deteriorating its illuminating properties—that is, making it poor and thin and of low candle-power.

Suitable openings may be made in the head A' and in the shell of the cylinder, and provided with caps or doors, for giving access to the spray pipe or trough and to the grates B. Brush-wood, or a mesh-work of intersecting sticks, may be used as a substitute for the beds of coke on grates B. Coke, however, answers all practical purposes. I prefer that the coke be arranged, as shown in the drawing, in beds, with intervening spaces for the sprays of water. The gas is better washed and its ammonia more completely absorbed by passing through alternate sprays of water and beds of coke than would be the case if passed through a solid mass of coke. The mechanical impurities are also better removed from the gas by passing it through the beds of coke than by passing it through only the sprays of water.

The combined scrubber and washer may be constructed in the following proportions, viz: The cylinder, twenty-seven feet high by eight feet in diameter; the induction and eduction pipes, twenty inches in diameter; and the grates placed eight feet apart, supporting beds of coke five feet thick. The number of the grates and their distance apart may vary, as may also the thickness of the beds of coke.

I am aware that a revolving spray-pipe, in connection with a gas-scrubber, is old; and I therefore make no claim to such broadly.

Having described my invention, what I claim, and desire to secure by Letters Patent, is—

1. A combined gas scrubber and washer, having beds of porous material and intervening spaces, in combination with a horizontal, radial, revolving, perforated spray pipe or trough, having a vertical limb extending centrally through the head of the scrubber, substantially as described.

2. A perforated spray pipe or trough of lead, in combination with a gas-washer, for the purpose set forth.

3. A perforated spray pipe or trough, having a U-shaped water-seal bend or trap, in combination with a gas-washer, as and for the purpose set forth.

4. A central, radial, revolving, perforated spray-pipe, having a U-shaped trap, in combination with operating mechanism, for revolving it and the cylinder of a gas washer and scrubber.

5. A radial, revolving, perforated spray pipe or trough in which the perforations increase in number and size from the inner toward the outer end, whereby the water is sprinkled and distributed evenly from center to circumference, and every part of the surface of coke equally wetted.

6. A radial, revolving, perforated lead spray pipe or trough, having a U-shaped water-seal trap, in combination with a combined gas washer and scrubber, substantially as and for the purpose described.

7. A steam-jet apparatus, in combination with a perforated spray-pipe of a gas washer and scrubber, for dissolving and blowing out tarry and other obstructions from the spray-pipe.

8. The perforated spray-trough of lead, having a strengthening backing of iron and a hinged cover, substantially as and for the purpose described.

In testimony that I claim the foregoing as my own I affix my signature in presence of two witnesses.

JOHN BALMORE.

Witnesses:
 WM. H. OSBORN,
 JOHN M. LONG.